United States Patent
Cao et al.

(10) Patent No.: US 10,394,248 B2
(45) Date of Patent: Aug. 27, 2019

(54) CHARGING PILE, METHOD AND DEVICE FOR RECOGNIZING THE CHARGING PILE

(71) Applicants: Xiaomi Inc., Haidan District, Beijing (CN); Beijing Rockrobo Technology Co. Ltd., Beijing (CN)

(72) Inventors: Jingying Cao, Beijing (CN); Hang He, Beijing (CN); Yongfeng Xia, Beijing (CN)

(73) Assignees: XIAOMI INC., Beijing (CN); BEIJING ROCKROBO TECHNOLOGY CO. LTD., Beijing (CN)

( * ) Notice: Subject to any disclaimer, the term of this patent is extended or adjusted under 35 U.S.C. 154(b) by 348 days.

(21) Appl. No.: 15/385,888

(22) Filed: Dec. 21, 2016

(65) Prior Publication Data
US 2017/0177001 A1    Jun. 22, 2017

(30) Foreign Application Priority Data
Dec. 21, 2015   (CN) .......................... 2015 1 0965386

(51) Int. Cl.
*H02J 7/00*    (2006.01)
*G05D 1/02*    (2006.01)
(Continued)

(52) U.S. Cl.
CPC .......... *G05D 1/0274* (2013.01); *A47L 9/2805* (2013.01); *A47L 9/2852* (2013.01);
(Continued)

(58) Field of Classification Search
CPC .... A47L 9/2805; A47L 9/2852; A47L 9/2873; A47L 2201/022; B60L 11/1825;
(Continued)

(56) References Cited

U.S. PATENT DOCUMENTS

| 9,510,505 B2 * | 12/2016 | Halloran | A01D 34/008 |
| 2011/0317173 A1 * | 12/2011 | Koike | G03G 21/1661 |
| | | | 356/620 |
| 2015/0115876 A1 | 4/2015 | Noh et al. | |

FOREIGN PATENT DOCUMENTS

| CN | 1541295 A | 10/2004 |
| CN | 201840423 U | 5/2011 |

(Continued)

OTHER PUBLICATIONS

Extended European Search Report of European Application No. 16205967.9.

(Continued)

*Primary Examiner* — Dalena Tran
(74) *Attorney, Agent, or Firm* — Jun He Law Offices P.C.; James J. Zhu

(57) ABSTRACT

A charging pile, a method and device for recognizing the charging pile are provided. The charging pile may include: a pile body having a side surface; a power interface provided on the side surface of the pile body to supply power for the autonomous cleaning device; an identification structure arranged on the side surface of the pile body to enable the autonomous cleaning device to recognize a position of the power interface and comprising a plurality of identification elements, each of the plurality of identification elements comprising at least one convex and at least one concave; wherein a retroreflection coefficient of any one of the at least one convex and the at least one concave is smaller than that of the other one of the at least one convex and the at least one concave and sufficient to form a retroreflected light recognizable by the autonomous cleaning device; and wherein at least one of the plurality of identification elements comprises a convex and a concave having mismatched specifications.

14 Claims, 11 Drawing Sheets

(51) Int. Cl.
  *G01S 17/89* (2006.01)
  *G02B 5/136* (2006.01)
  *A47L 9/28* (2006.01)
  *B60L 53/14* (2019.01)
  *B60L 53/31* (2019.01)
  *B60L 53/36* (2019.01)
  *B60L 53/60* (2019.01)

(52) U.S. Cl.
  CPC ............ *A47L 9/2873* (2013.01); *B60L 53/14* (2019.02); *B60L 53/31* (2019.02); *B60L 53/36* (2019.02); *B60L 53/60* (2019.02); *G01S 17/89* (2013.01); *G02B 5/136* (2013.01); *G05D 1/0225* (2013.01); *G05D 1/0236* (2013.01); *H02J 7/0044* (2013.01); *H02J 7/0045* (2013.01); *A47L 2201/022* (2013.01); *B60L 2260/32* (2013.01); *G05D 1/0246* (2013.01); *G05D 2201/0203* (2013.01); *Y02T 10/7005* (2013.01); *Y02T 10/7072* (2013.01); *Y02T 90/121* (2013.01); *Y02T 90/125* (2013.01); *Y02T 90/128* (2013.01); *Y02T 90/14* (2013.01); *Y02T 90/163* (2013.01)

(58) Field of Classification Search
  CPC .. B60L 11/1833; B60L 11/1816; G01S 17/89; G02B 5/136; G05D 1/0225; G05D 1/0274; G05D 2201/0203
  USPC ....... 700/259; 250/203.3; 398/170; 382/103, 382/106, 291
  See application file for complete search history.

(56) References Cited

FOREIGN PATENT DOCUMENTS

| | | |
|---|---|---|
| CN | 104586320 A | 5/2015 |
| CN | 105259918 A | 1/2016 |
| CN | 105990876 A | 10/2016 |
| CN | 205681138 U | 11/2016 |
| JP | 2009201226 A | 9/2009 |
| WO | 2015090397 A1 | 6/2015 |

OTHER PUBLICATIONS

International Search Report of PCT Application No. PCT/CN2016/107517.

* cited by examiner

CHARGING PILE, METHOD AND DEVICE FOR RECOGNIZING THE CHARGING PILE

CROSS-REFERENCE TO RELATED APPLICATION

This application is based on and claims priority to Chinese Patent Application No. 201510965386.4, filed on Dec. 21, 2015, which is incorporated herein by reference in its entirety.

FIELD

The present disclosure relates to the technical field of autonomous cleaning, and more particularly, to a charging pile, a method and device for recognizing the charging pile.

BACKGROUND

Typically, a smart sweeping robot, a smart mopping robot and other kinds of autonomous cleaning devices may perform various types of autonomous cleaning operations, which provide convenience use experience for the user. To clean a large area, the autonomous cleaning device is usually equipped with a built-in power supply, which may enable the autonomous cleaning device to be independent from an external power supply and achieve more liberalize clean operations. Correspondingly, before running out of the built-in power supply, the autonomous cleaning device should be able to automatically recognize the external power supply and accurately go back to the location of the external power supply, so as to be completely relieved from the guard and cooperation operations performed by the user, and achieve a truly automatic clean operation.

The autonomous cleaning device with laser direct structuring (LDS) may take a pattern having regular bright and dark changes as the pattern for recognizing the charging pile. However, the recognition result for the pattern having regular bright and dark changes usually appears to be misjudged, because it's likely to have a pattern similar to the pattern of the charging pile at home (the LDS recognizes brightness and darkness according to the reflected light from an object, and if an object has a alternatively bright and dark stripe thereon, or is composed alternatively by two materials with different reflection intensity, or is shined by sunshine transmitted through a striped fence, the intensity of the reflected light may have a intensity change, which leads to the misjudgment). The cleaning device may mistake for the charging pile and look for the butt joint on furniture or walls with a certain impulsive force repeatedly using its charging electrode made of metal. On the one hand, it's harmful to the furniture or wall, and on the other hand, the robot cannot be charged and continue to work when no person is around it, and may stop in a wrong place when only half of the room is cleaned, which leads to a bad user experience.

SUMMARY

According to a first aspect of embodiments of the present disclosure, a charging pile for an autonomous cleaning device is provided. The charging pile includes: a pile body having a side surface; a power interface provided on the side surface of the pile body to supply power for the autonomous cleaning device; an identification structure arranged on the side surface of the pile body to enable the autonomous cleaning device to recognize a position of the power interface and comprising a plurality of identification elements, each of the plurality of identification elements comprising at least one convex and at least one concave; wherein a retroreflection coefficient of any one of the at least one convex and the at least one concave is smaller than that of the other one of the at least one convex and the at least one concave and sufficient to form a retroreflected light recognizable by the autonomous cleaning device; and wherein at least one of the plurality of identification elements comprises a convex and a concave having mismatched specifications.

According to a second aspect of embodiments of the present disclosure, a method for recognizing a charging pile is provided. The method includes: acquiring surface characteristics of surrounding objects; determining an object as the charging pile when a surface of the object comprises surface characteristics matching with a preset identification structure within an allowed error range; wherein the preset identification structure comprises a plurality of identification elements, each of the plurality of identification elements comprising at least one convex and at least one concave; wherein a retroreflection coefficient of any one of the at least one convex and the at least one concave is smaller than that of the other one of the at least one convex and the at least one concave and sufficient to form a retroreflected light recognizable by the autonomous cleaning device; and wherein at least one of the plurality of identification elements comprises a convex and a concave having mismatched specifications.

According to a third aspect of embodiments of the present disclosure, a device for recognizing a charging pile is provided. The device includes: a processor; and a memory for storing instructions executable by the processor; wherein the processor is configured to: acquire surface characteristics of surrounding objects; determine an object as the charging pile when a surface of the object comprises surface characteristics matching with a preset identification structure within an allowed error range; wherein the preset identification structure comprises a plurality of identification elements, each of the plurality of identification elements comprising at least one convex and at least one concave; wherein a retroreflection coefficient of any one of the at least one convex and the at least one concave is smaller than that of the other one of the at least one convex and the at least one concave and sufficient to form a retroreflected light recognizable by the autonomous cleaning device; and wherein at least one of the plurality of identification elements comprises a convex and a concave having mismatched specifications.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to example embodiments, examples of which are illustrated in the accompanying drawings. The following description refers to the accompanying drawings in which same numbers in different drawings represent same or similar elements unless otherwise described. The implementations set forth in the following description of example embodiments do not represent all implementations consistent with the present disclosure. Instead, they are merely examples of devices and methods consistent with aspects related to the present disclosure as recited in the appended claims.

Figure 1:
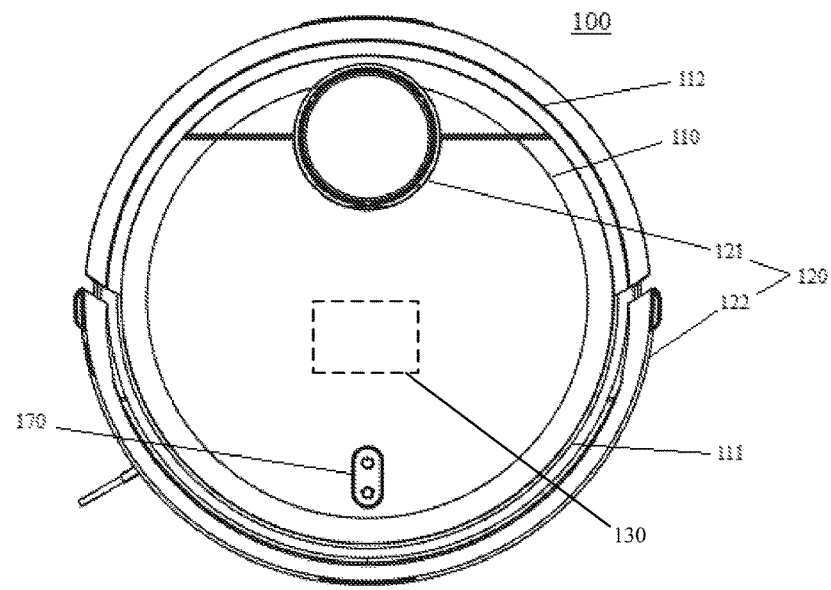
FIG. 1-3 is a structural schematic diagram illustrating a robot according to an exemplary embodiment.
Figure 2:
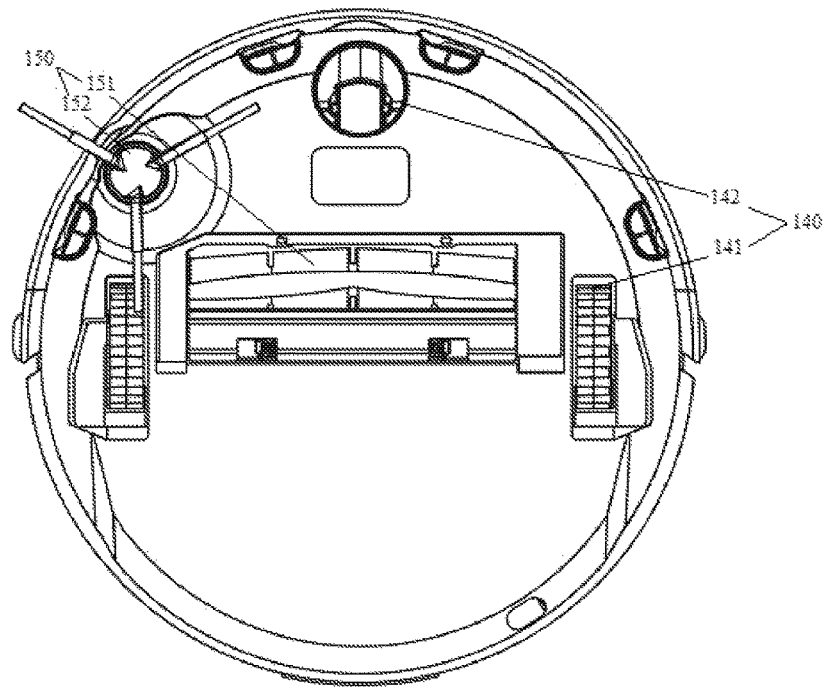
Figure 3:
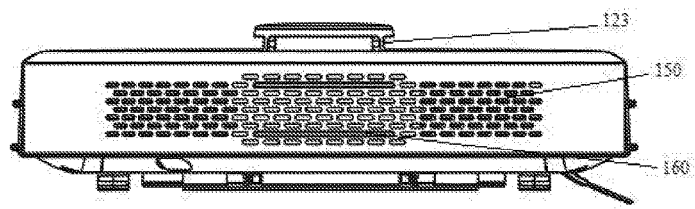

FIG. 1-3 is a structural schematic diagram illustrating a robot according to an exemplary embodiment. As shown in FIGS. 1 to 3, the robot 100 may be an autonomous cleaning device, such as a swapping robot, a mopping robot and the like. The robot 100 may include a robot body 110, a recognition system 120, a control system 130, a drive system 140, a clean system 150, an energy system 160 and a human-machine interactive system 170.

The robot body 110 includes a forward part 111 and a backward part 112, and may be nearly circular (both of the forward part 111 and the backward part 112), and the robot 100 may also have other shapes including, but not limited to, a proximate D-shape (the forward part 111 is square and the backward part 112 is circular).

The recognition system 120 includes a position determination device 121 above the robot body 110, a buffer 122 disposed on the forward part 122 of the robot body 110, a cliff sensor 123 and an ultrasonic sensor (not shown), an infrared sensor (not shown), a magnetometer (not shown), an accelerometer (not shown), a gyroscope (not shown), an odometer (not shown) and the like, to provide various position information and motion state information to the control system 130. The position determination device 121 includes, but not limited to, a camera, a laser ranging device (LDS). In the following, the laser ranging device based on a triangulation ranging method is taken as an example to describe how to determine position. The basic principle of the triangular measurement method is based on the geometric relationship of similar triangles, which will not be explained herein.

The laser ranging device includes a light-emitting unit and a light-receiving unit. The light-emitting unit may include a light source for emitting light, which may include a light-emitting element, such as an infrared LED for emitting infrared ray, a visible light LED for emitting visible light. For example, the light source may be a light-emitting element for emitting laser beams. In the embodiment, a laser diode (LD) is taken as an example of the light source. Specifically, due to the monochromaticity, directiveness, and collimation of the laser beam, the light source emitting the laser beam may make the measurement more accurate when compared with other beams. For example, the infrared ray or the visible light emitted by a LED may have a lower accuracy than the laser beam due to the influence of the surrounding environment (the color or the texture of the target). The LD may be a dot laser measuring the two-dimensional position information of obstacles, and also may be a line laser measuring the three-dimensional position information of the obstacles in a certain scope.

The light-receiving unit may include an image sensor which has light spots reflected or scattered by obstacles. The image sensor may be a collection of multiple pixels in a single row or multiple rows. The light-receiving element may convert the optical signals to electrical signals. The image sensor may be a Complementary Metal-Oxide-Semiconductor Transistor (CMOS) sensor or a Charge Coupled Device (CCD) sensor, and the CMOS sensor is preferred due to its low cost. In addition, the light-receiving unit may include an optical lens component. The light reflected or scattered by obstacles may travel to the image sensor to form an image via the optical lens component. The optical lens unit may include one or more lens.

A base may support the light-emitting unit and the light-receiving unit which are arranged on the base and separate a certain distance. In order to measure the obstacles around the robot in 360-degree directions, the base may be rotatably arranged on the robot body, or the base itself doesn't rotate but the reflected light or the received light rotate by arranging a rotate element. The rotate angular velocity of the rotate element may be obtained by arranging an optocoupler element and an encoding disk. The optocoupler element recognize the missing teeth of the encoding disk and obtain the instantaneous angular velocity by dividing the time passing through the spacing between the missing teeth by the spacing distance between the missing teeth. The greater the density of the missing teeth on the encoding disk is, the higher the accuracy and precision are, but the structure should be more precise and a larger amount of computation is also required. On the contrary, the smaller the density of the missing teeth on the encoding disk is, the lower the accuracy and precision are, but the structure could be simpler and the amount of computation is smaller, which may reduce the cost.

A data processing device connected with the light-receiving unit, for example, a DSP, records the distance values from the obstacles at all angles with respect to the 0-degree direction of the robot, and transmits them to the data processing unit in the control system 130, for example, an application processor including a CPU. The CPU may operate a positioning algorithm based on a particle filter to obtain the current position, and make map for navigation. In one embodiment, the positioning algorithm is simultaneous localization and mapping (SLAM).

Although the laser ranging device based on the triangulation ranging method can measure a distance value at infinity and beyond a certain distance theoretically, in fact, it's hard to achieve a long distance measurement, for example, more than 6 m, due to the limitation of the size of the pixel unit on the sensor of the light-receiving unit and the influences of the photovoltaic conversion speed of the sensor, the data transmission speed between the sensor and the DSP connected with the sensor, and the computation speed of the DSP. Due to the temperature, the laser ranging device may obtain a measured value with an unacceptable error, which is mainly because the change of the angle between the incident light and emergent light caused by the distortion of the structure between the light-emitting unit and the light-receiving unit due to the thermal expansion, and the light-emitting unit and the light-receiving unit themselves may have a problem of temperature drift. In addition, After a long time use, the laser ranging device may have a deformation caused by the accumulation of various factors, such as, temperature change, vibration and the like, which may seriously affect the measure result. The accuracy of the measure result will directly decide the accuracy of making map, which is the basis of the strategy implementation of the robot and is especially important.

The forward part 111 of the robot body 110 may bear the buffer 122. When a driving wheel module 141 propels the robot to move on the floor in the cleaning process, the buffer 122 detects one or more events (or objects) in the moving path of the robot via the sensor system, for example, an infrared sensor, and the robot may control the driving wheel module 141 to response to the events (objects) detected by the buffer 122, for example, moving away from obstacles.

The control system 130 is arranged on the circuit board in the robot body 110, and includes a computing processor (e.g., a central processing unit or an application processor) which is communicated with a non-transient memory, for example, a hard disk, a flash memory, or a random access memory, and the application processor may make a real-time map of the environment where the robot locates using a positioning algorithm, such as SLAM, based on the feedback obstacle information from the laser ranging device. Combined with feedback distance information and speed information from the buffer 122, the cliff sensor 123 and the ultrasonic sensor, the infrared sensor, the magnetometer, the accelerometer, the gyroscope, and the odometer, the application processor may decide the robot currently is in what working state, for example, cross a threshold, moving to a carpet, near a cliff, getting stunk, the dust box being full, being picked up and the like. The application processor may also give a next action strategy according to the different situations, such that the operations of the robot may more conform to the user's requirement, and bring a better user experience. Furthermore, the control system 130 may plan a most effective and reasonable clean path and clean mode based on the real-time map made by SLAM, to greatly improve efficiency of cleaning.

The energy system 160 includes a rechargeable battery marked on the robot body 110 in FIG. 3, and a charging pile outside the robot body 110 which is not shown in the figure. The rechargeable battery may be a nickel-metal hydride battery or a lithium battery and so on. The rechargeable battery may be connected with a charging control circuit, a charging temperature detection circuit for a battery pack and a low battery voltage monitoring circuit which are also connected with a microprocessor control circuit. The machine may be charged by connecting a charging electrode on the side or the bottom of the machine body to the charging pile. If an exposed charging electrode has dust thereon, during charging, due to the charge calculative effect, the plastic machine body around the charging electrode may be melt and deformed, and even the charging electrode itself may be distorted, which leads to not charging correctly. In the technical solution of the present disclosure, the structure of the charging pile has been improved correspondingly to help the charging pile to be better recognized, so as to make the robot 100 more easily recognize and utilize the charging pile. In the following, the structure of a charging pile will be described in detail in conjunction with other figures.

Figure 4:
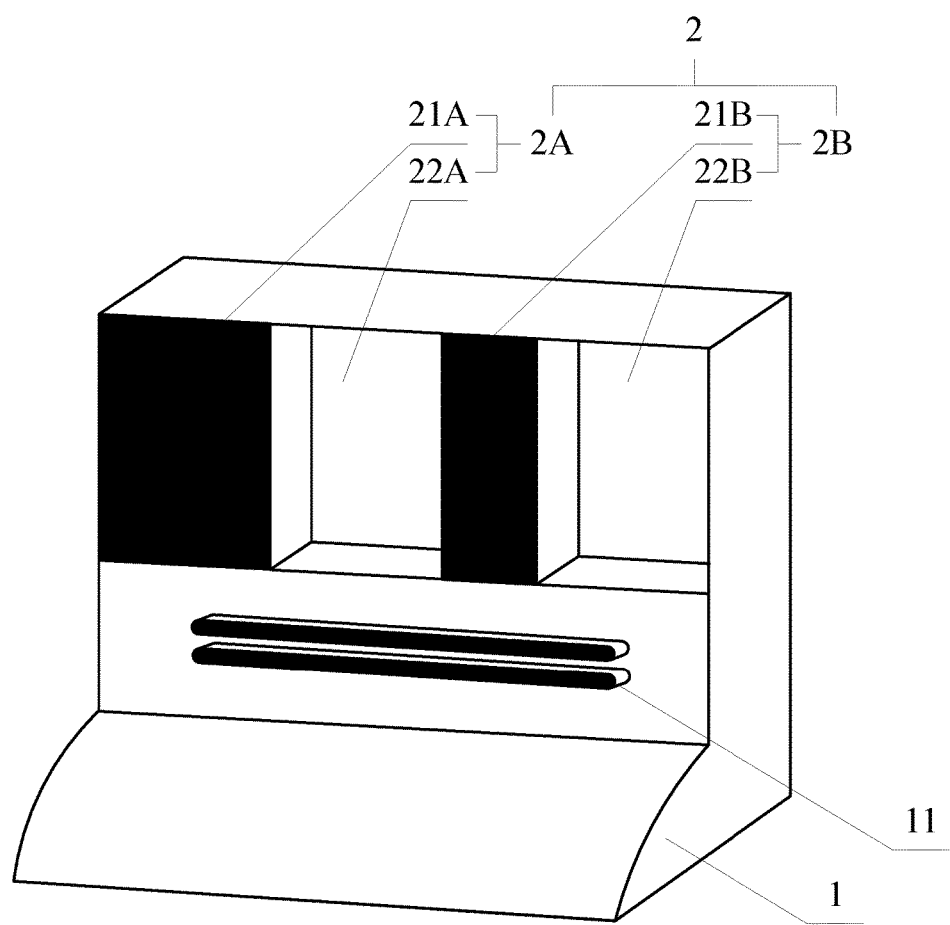
FIG. 4 is a structural schematic diagram illustrating a charging pile according to an exemplary embodiment.

FIG. 4 is a structural schematic diagram illustrating a charging pile according to an exemplary embodiment. As shown in FIG. 4, the charging pile is used to charge an autonomous cleaning device, for example, a device which may perform autonomous cleaning operations, such as, a sweeping robot, a mopping robot and the like. The charging pile may include: a pile body 1, a power interface 11 provided on a side surface of the pile body 1 to supply power for the autonomous cleaning device (not shown); and an identification structure 2 arranged on the side surface of the pile body 1 to enable the autonomous cleaning device to recognize and determine a position of the power interface 11.

As shown in the figure, the identification structure 2 and the power interface 11 are arranged on the same side surface, for example, they are both arranged on the front surface of the pile body 1 shown in FIG. 4, and the identification structure 2 is above the power interface 11. The identification structure 2 and the power interface 11 may have various kinds of positional relationship, for example, the identification structure 2 may be below the power interface 11, or they may be arranged in the horizontal direction, which will not be limited herein.

The identification structure 2 may include at least one identification element, and each identification element comprises at least one convex and at least one concave, the retroreflection coefficient of the convex is smaller than that of the surface of the concave, and intensity of retroreflected light from the convex is not smaller than a minimum recognizable light intensity of the recognition device described above. The greater the retroreflection coefficient is, the brighter the surface of the corresponding object detected by the recognition device is. Similarly, the smaller the retroreflection coefficient is, the darker the surface of the corresponding object detected by the recognition device is. In one embodiment, the convex may have a dark surface compared to the concave, and the concave may have a bright surface compared to the convex. Correspondingly, as shown in FIG. 4, two identification elements include the identification element 2A and the identification element 2B, and the identification element 2A includes a convex 21A and a concave 22A, the identification element 2B includes a convex 21B and a concave 22B. The surfaces of the convexes 21A and 21B are dark surface, and the surfaces of the concaves 22A and 22B are bright surface.

According to the above embodiments, the charging file of the embodiments of the present disclosure has the following features and corresponding technical effects.

1) A unique appearance of structure. By configuring the pile body 1 of the charging pile with the identification structure 2 having a convex and concave structure, the differentiation degree of the pile body 1 may be improved based on the unique appearance, which helps the autonomous cleaning device to search and recognize the pile body 1.

2) A unique light effect. By configuring bright and dark features on the surfaces of the convexes 21A and 21B, and the concaves 22A and 22B. Specifically, the surfaces of the convexes 21A and 21B is the dark surface and the surfaces of the concaves 22A and 22B is the bright surface, the identification structure 2 may be distinguished from the light effects normally generated by objects (for example, a curtain having an alternatively arranged convex and concave structure and showing a light effect of the convex surface being bright and the concave surface being dark, which is completely opposite to the light effect of the identification structure 2) in the working environment of the autonomous cleaning device, which helps to avoid misrecognition of the autonomous cleaning device.

1. Retroreflection Coefficient Configuration

On the one hand, the retroreflection coefficient is related with the surface structure and the material of the object, for example, the micro-spherical or micro-tapered surface structure has a greater retroreflection coefficient. On the other hand, the retroreflection coefficient is related with the gray value (that is, related with color), the greater the gray value is, the smaller the retroreflection coefficient is, for example, a laser has a density of 1 and it's density value will be dramatically reduced after being retroreflected by a black material, for example, even reach 0.1.

While meeting the requirement that the retroreflection coefficient of the dark surfaces, such as the convexes 21A and 21B, is smaller than that of the bright surfaces, such as the concaves 22A and 22B, the retroreflection coefficient of the dark surfaces should be ensured to be high enough, so as to enable the recognition device of the autonomous cleaning device to at least recognize the light intensity of the retroreflected light from the dark surfaces. In one embodiment, the difference between the bright surface and the dark surface should reach a preset difference, so as to enable the recognition device to correctly distinguish the light intensity difference of them.

For example, for a laser with a light intensity of 1, it should be ensured that the intensity of the retroreflected light from the dark surface is 0.3, and the intensity of the retroreflected light from the bright surface is 0.6. With respect to the charging pile in the embodiment shown in FIG. 4, the recognition device may recognize that a surface having a light intensity of 0.3 and a certain width and depth, and a surface having a light intensity of 0.6 and a certain width and depth alternately appear. It should at least be ensured that the intensity of the retroreflected light from the dark surface is not smaller than 0.05, otherwise the recognition device may not be able to recognize and determine if there is a structure surface with a certain width and depth at the corresponding location, and cannot detect the depth difference of the convex surface and the concave surface.

The bright surface may employ various reflective films which has a certain retroreflection coefficient. For example, the project grade 3200 series from the 3M Company may be employed; similarly, the project grade 3400 series, the super intensity grade 3930 series, and the soft grade 610SG series and the like may also be employed.

The dark surface may employ the material with a small retroreflection coefficient. In one embodiment, dark-colored foam cotton, a dark-colored printing material, a dark-colored sandblasting material, or an injection molding material having a surface with special lines and the like may be selected, wherein, the injection molding material having a surface with special lines may be the injection molding material with irregularly shallow etched lines. When the dark surface is selected, black foam cotton may be improper due to its smaller retroreflection coefficient, the recognized result is same with the result of the case that there is no dark surface or the recognition surface is at infinity, so it's hard to determine the distance of the dark surface.

The following aspects should be noted.

(1) In the above embodiments, the "dark" surface and the "bright" surface, the "high" gray value and the "low" gray value have relative relationship, which are not absolute description. For example, when the retroreflection coefficient of the surface of the convex 21A is smaller than that of the surface of the concave 22A, the recognition device on the autonomous cleaning device may decide that the convex 21A has a relatively dark surface and the concave 22A has a relatively bright surface. When the retroreflection coefficient of the surface of the convex 21B is smaller than that of the surface of the concave 22B, the recognition device should still decide that the convex 21B has a relatively dark surface and the concave 22B has a relatively bright surface, even if the retroreflection coefficient of the surface of the convex 21B may be greater than that of the surface of the convex 21A or concave 22A.

(2) When the comparison of two objects are involved, for example, when the retroreflection coefficients of the convex 21A and the concave 22A are compared, it should be ensured that difference between the intensities of the retroreflected light from the convex 21A and the concave 22A is greater than a recognition error of the recognition device, so as to ensure the difference of their retroreflection coefficients is recognizable by the recognition device.

(3) Those skilled in the art should understand that, the convexes of each identification element having a dark surface and the concaves of each identification element having a bright surface may be achieved in other ways, which is not limited herein.

2. Identification Element 1) the Number of Convex and Concave

In the embodiment shown in FIG. 4, the identification element 2A and the identification element 2B respectively include only one convex and one concave. However, those skilled in the art should understand that this is merely for illustrative. In fact, each identification element may include one or more convexes and one or more concaves, the numbers of the convexes and concaves included in each identification element are not limited in the present disclosure.

2) Specification Match (1) Criterion

With respect to the convexes and concaves in each identification element, the specification relationship may include: the specifications of the convex and the concave are matched, or the specifications of the convex and the concave are mismatched, wherein, the judgment of the "matched" and the "mismatched" may include the flowing ways.

Figure 5:
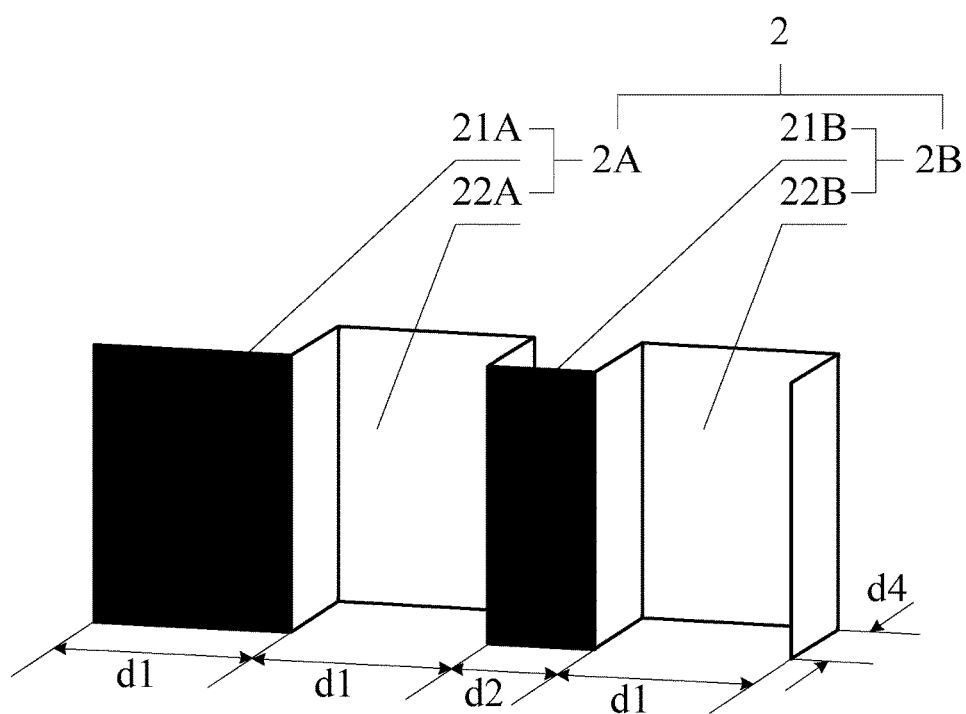
FIG. 5 is a schematic diagram illustrating an identification structure on the charging pile according to some embodiments.

As shown in FIG. 5, with respect to the convex 21A and concave 22A in the identification element 2A, the convex 21A and the concave 22A both have a specification parameter d1 in the horizontal direction, that is, the convex 21A and the concave 22A has a same specification parameter in the horizontal direction (the horizontal direction is taken as an example for illustration herein), so the convex 21A and the concave 22A of the identification element 2A may be considered as being matched.

Similarly, As shown in FIG. 5, with respect to the convex 21B and concave 22B in the identification element 2B, the convex 21B and the concave 22B have respective specification parameters d2 and d1 in the horizontal direction, that is, the convex 21B and the concave 22B has a different specification parameter in the horizontal direction (the horizontal direction is taken as an example for illustration herein), so the convex 21B and the concave 22B of the identification element 2B may be considered as being mismatched.

Figure 6:
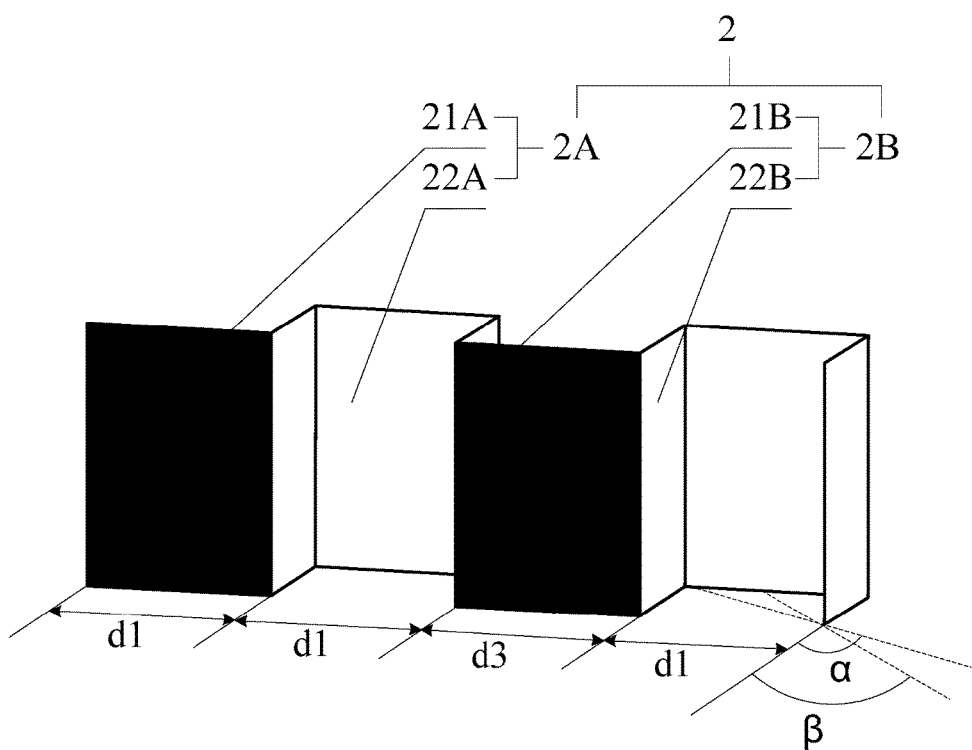
FIG. 6 is a schematic diagram illustrating an identification structure on the charging pile according to some embodiments.

The recognition device of the autonomous cleaning device may have some recognition error, and the recognition error may be taken into account according to a more accurate recognition requirement. For example, as shown in FIG. 6, although the convex 21B and the concave 22B of the identification element 2B have respective specification parameters d3 and d1, and d3 is not equal to d1, the recognition device cannot distinguish d3 and d1 in fact and may believe that the corresponding convex 21B and concave 22B are matched.

It should be understood that if the difference between preset specification parameters of the convex and the concave of one identification element is not greater than a recognition error of the recognition device, that is, their preset specification parameters are the same for the recognition device, and it may be believed that the convex and the concave of the identification element are matched; if not, they're mismatched.

In addition to the "same specification" used as the judgment condition in the embodiment, other embodiments may use more judgment conditions, for example, it can be decided that the convex and the concave are matched if the difference between the specification parameters of the convex and the concave is not greater than a preset value.

(2) Structure Form

Based on the judgment process for "matched" in the above embodiment, when the identification structure 2 on the charging pile includes multiple identification elements, a part of the multiple identification elements are configured to have matched convexes and concaves, and the other part are configured to have mismatched convexes and concaves.

For example, in the embodiment shown in FIG. 5, the convex 21A and the concave 22A of the identification element 2A are matched, and the convex 21B and the concave 22B of the identification element 2B are mismatched. In the embodiment shown FIG. 6, the convex 21A and the concave 22A of the identification element 2A are matched, and the convex 21B and the concave 22B of the identification element 2B are also matched, so they cannot compose the identification structure 2 in the embodiment of the present disclosure.

(3) Specification Configuration

With the consideration of the recognition error of the recognition device, for example, for the identification element 2B shown in FIG. 5-6, the preset specification parameter of the convex 21B, and the preset specification parameter of the concave 22B, and the depth difference d4 between the surface of the convex 21B and the surface of the concave 22B should be properly configured, so as to avoid the misrecognition of the recognition device.

On the one hand, the preset specification parameter of the convex 21B, and the preset specification parameter of the concave 22B, and the depth difference d4 should not be too small. In one embodiment, the recognition device emits detection light (such as laser) around in a range of 360-degree, so as to detect the distance from the objects around it. The recognition device emits light to objects around it by rotating 360-degree, and it has a preset unit rotate angle, for example, 0.5-degree, which leads to a light emitting spacing formed after the light being emitted to the objects. Therefore, the preset specification parameter of the convex 21B and the preset specification parameter of the concave 22B should not be smaller than the light emitting spacing, to avoid being not able to be detected. When the light emitting spacing and the recognition error d0 described above are taken into account, the preset specification parameter of the convex 21B and the preset specification parameter of the concave 22B may further be: not smaller than the twice of the light emitting spacing plus twice of the recognition error. Similarly, in order to accurately recognize and distinguish the convexes and concaves of each identification element, the depth difference d4 should not be smaller than the recognition error of distance measurement performed by the recognition device, so as to enable the recognition device to accurately recognize the convex 22B and distinguish the convex 22B from the concave 21B. For example, the depth difference d4 may further be not smaller than the twice of the recognition error.

On the other hand, the depth value d4 should not be too big. As shown in FIG. 6, if the autonomous cleaning device are required to achieve the automatic recognition of the charging pile in the largest angle α, at least a part of the bottom surface of the concave 22B should be able to reflect the light emitted by the recognition device of the autonomous cleaning device to the recognition device when the light has angle α with the pile body 1, such that the recognition device is able to detect and recognize the corresponding part of the bottom surface of the concave 22B, and complete the recognition of the concave 22B. Therefore, in each identification element, the specification of the bottom surface of the concave 22B should be matched with the specification of the side wall, so as to enable the side wall of the concave to shield at most a part of the bottom surface when the recognition device recognize any side surface of the charging pile in a preset angle range (e.g., the angle α or other angles less than α, such as the angle β shown in FIG. 3), such that at least a part of the bottom surface of the concave is recognizable (i.e., the part can reflect the light to the recognition device for recognition), and the preset specification parameter of the part is not smaller than the recognition error of the recognition device and the minimum recognizable distance of the recognition device.

With respect to the identification structure 2 shown in FIG. 5, in an exemplary embodiment, the size d1 of the convex 21A, the concave 22A, and the concave 22B may be 6 cm, and the size d2 of the convex 21B may be 3 cm, and the depth may be 1.6 cm. In another exemplary embodiment, the sizes of the convex 21A and the concave 22A of the identification element 2A shown in FIG. 5 may be different, for example, the size of the convex 21A may be 5 cm and the size of the concave 22A may be 6 cm, the size of the convex 21B may be 3.5 cm and the size of the concave 22B may be 6 cm, and the depth may be 1.8 cm.

Arrangement Direction

Figure 7:
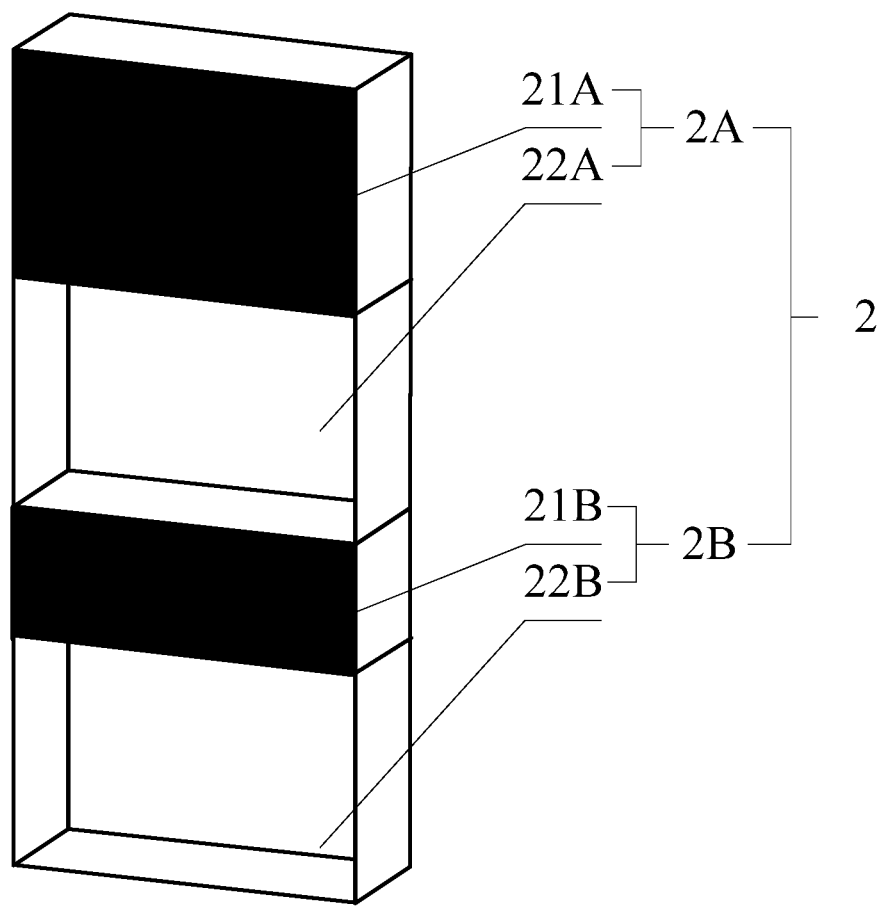
FIG. 7 is a schematic diagram illustrating an identification structure on the charging pile according to some embodiments.
Figure 8:
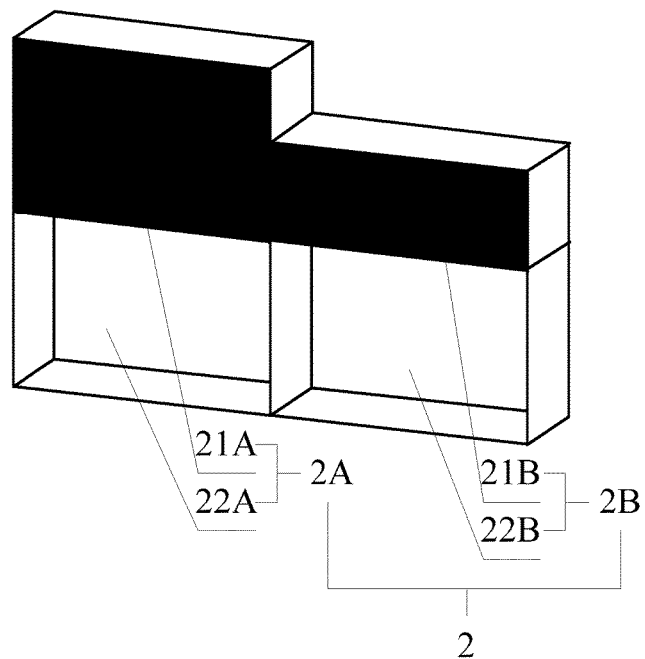
FIG. 8 is a schematic diagram illustrating an identification structure on the charging pile according to some embodiments.

Although in the embodiments shown in FIG. 4-6, the identification element 2A and the identification element 2B and the convex and the concave of each identification element (for example, the convex 21A and the concave 22A, the convex 21B and the concave 22B) are arranged in the horizontal direction, but the direction is not limited by the present disclosure and any arrangement may be used as needed. For example, as shown in FIG. 7, the identification element 2A and the identification element 2B and the convex and the concave of each identification element may be arranged in the vertical direction; or as shown in FIG. 8, the identification element 2A and the identification element 2B may be arranged in the horizontal direction, and the convex 21A and the concave 22A, the convex 21B and the concaves 22B may be arranged in the vertical direction.

In one embodiment, multiple identification elements and the convex and the concave of each identification element are arranged in a direction along a preset recognition path of the recognition device, to enable the recognition device to sequentially determine preset specification parameters of respective identification elements. For example, in the embodiment shown in FIG. 5, if the recognition device of the autonomous cleaning device employs the preset recognition path along the horizontal direction (e.g., the recognition is performed from left to right in the horizontal direction), the identification element 2A and the identification element 2B, the convex 21A and the concave 22A, and the convex 21B and the concave 22B may be arranged in the horizontal direction, so as to enable the recognition device to sequentially recognize the convex 21A, the concave 22A and the identification element 2A composed by the convex 21A and the concave 22A, and the convex 21B, the concave 22B and the identification element 2B composed by the convex 21B and the concave 22B.

4) Structure Form

In the above-described embodiments, the convex and the concave of each the identification element are adjacently arranged and have a structure with a rectangle cross-section. In fact, the identification structure 2 is only required to have the features of "convex and concave structure" and "bright and dark surface", its specific structure is not limited in the present disclosure.

Figure 9:
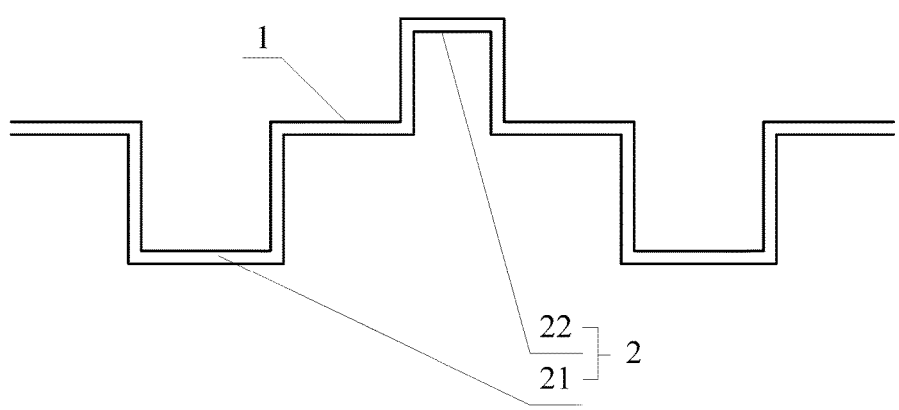
FIG. 9 is a top view diagram illustrating an identification structure on the charging pile according to some embodiments.
Figure 10:
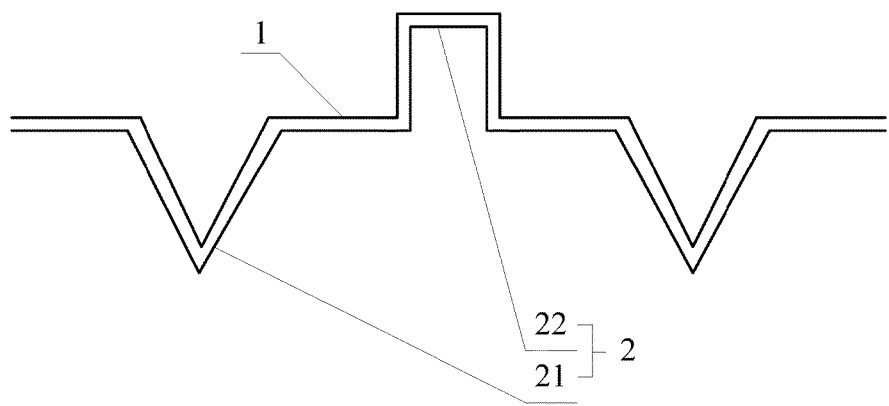
FIG. 10 is a top view schematic diagram illustrating an identification structure on the charging pile according to some embodiments.

In one embodiment, as shown in FIG. 9, the convex 21 and the concave 22 on one identification element of the identification structure 2 can still has a rectangle cross-section, but the convex 21 and the concave 22 are not adjacently arranged, for example, they may have a preset distance. In another embodiment, as shown in FIG. 10, the convex 21 on one identification element of the identification structure may be configured with a triangular prism structure (whose cross-section is triangle), and the concave 22 still has a rectangle cross-section, and the convex 21 and the concave 22 may be not adjacently arranged.

Based on the charging pile structure described above, the present disclosure provides a recognition method applied to the charging pile of an autonomous cleaning device, which will be described in detail in the following.

Figure 11:
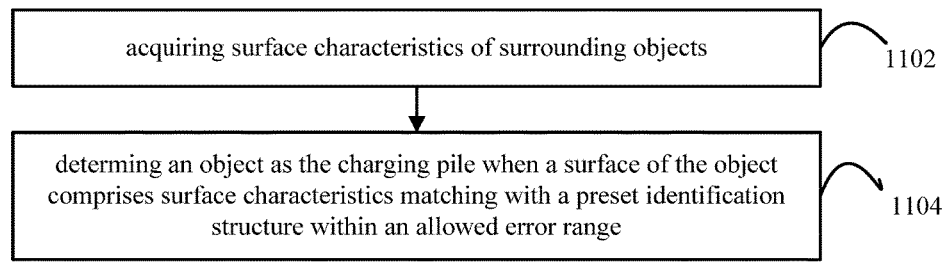
FIG. 11 is a flow diagram illustrating a method for recognizing a charging pile according to an exemplary embodiment.

FIG. 11 is a flow diagram illustrating a method for recognizing a charging pile according to an exemplary embodiment. As shown in FIG. 11, the method may be applied to an autonomous cleaning device and comprise the following steps.

At step 1102, the surface characteristics of the surrounding objects are acquired.

At step 1104, an object is determined as the charging pile for an autonomous cleaning device when a surface of the object comprises surface characteristics matching with a preset identification structure within an allowed error range, wherein the preset identification structure includes a plurality of identification elements, and each of the plurality of identification elements includes at least one convex and at least one concave. A retroreflection coefficient of any one of the at least one convex and the at least one concave is smaller than that of the other one of the at least one convex and the at least one concave and sufficient to form a retroreflected light recognizable by the autonomous cleaning device, and at least one of the plurality of identification elements includes a convex and a concave having mismatched specifications.

In the embodiment, the surface characteristic may include multiple predefined feature type. For example, in one embodiment, the surface characteristic may be a preset specification parameter, such as a vertical height, a horizontal width, a depth and the like, the autonomous cleaning device may acquire the preset specification parameters of every convex and every concave on the surface of one object respectively. When the preset specification parameters of every convex and every concave on the surface of the object are matched with the preset specification parameters of the corresponding parts in the preset identification structure, the object is determined to match with the preset identification structure and is determined as the charging pile for the autonomous cleaning device. For example, if the charging pile has a convex and a concave which are adjacently arranged, and the horizontal width of the convex is 6 cm and the horizontal width of the concave is 3 cm, the autonomous cleaning device may measure the distance from the sample points formed on the surrounding objects by the laser ranging device, to obtain the convex and concave feature and the horizontal width of the corresponding object. When one object includes a convex with a horizontal width of 6 cm and the concave with a horizontal of 3 cm, the object may be determined to be a charging pile.

In another embodiment, the surface characteristic may be the retroreflection coefficient. The autonomous cleaning device may acquire the retroreflection coefficients of every convex and every concave on the surface of the object, respectively; and when the retroreflection coefficients of the convex and the concave on the surface of one object respectively match with the retroreflection coefficient of a corresponding part of the preset identification structure, the object is determined to match with the preset identification structure and the object is determined as the charging pile for the autonomous cleaning device. For example, if the charging pile includes a convex and a concave which are adjacently arranged, and the retroreflection coefficient on the surface of the convex may make the laser with the intensity of 1 have a reflected light intensity of 0.3, and the retroreflection coefficient on the surface of the concave may make the laser with the intensity of 1 have a reflected light intensity of 0.6. Then autonomous cleaning device may emit a laser beam, whose intensity is 1, to the surrounding objects and receive the corresponding reflected light, the autonomous cleaning device may decide that an object is the charging pile if the object includes a convex with a reflected light intensity of 0.3 and a concave with a reflected light intensity of 0.6.

The present specification parameters and the retroreflection coefficient may be used as the surface characteristics at the same time, which will not be repeated herein.

On the one hand, by configuring an identification structure composed by a convex and concave structure on the pile body of the charging pile, the differentiation degree of the pile body may be improved based on the corresponding special appearance. On the other hand, by configuring a bright and dark feature on the surfaces of the convex and the concave, the identification structure may be distinguished from the light effects normally generated by objects in the working environment, which helps to avoid misrecognition of the autonomous cleaning device.

Figure 12:
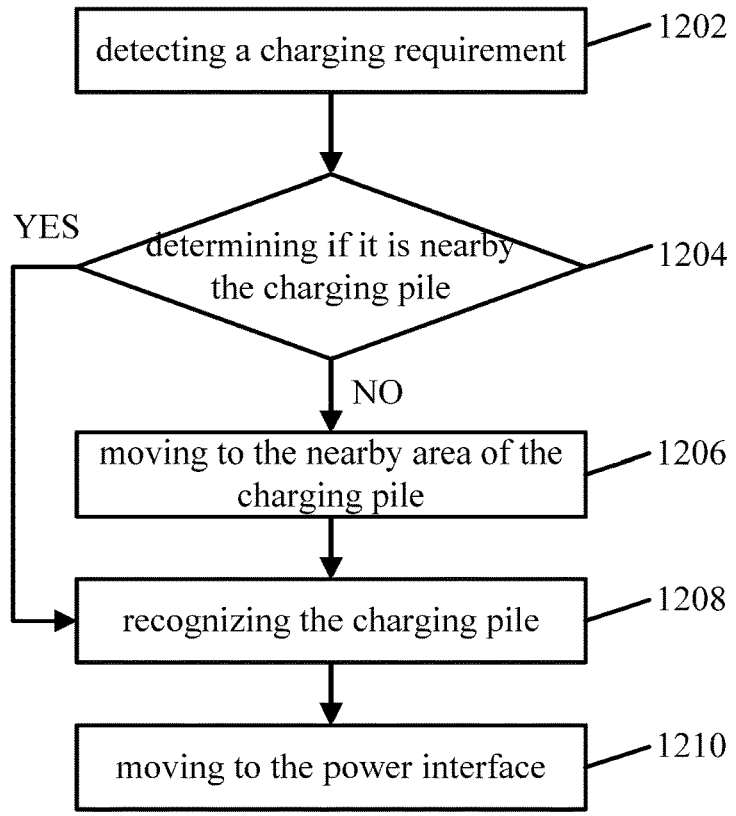
FIG. 12 is a flow diagram illustrating another method for recognizing a charging pile according to an exemplary embodiment.

FIG. 12 is a flow diagram illustrating another method for recognizing a charging pile according to an exemplary embodiment. The method may include the following steps when applied to a sweeping robot.

At step 1202, the sweeping robot detects a charging requirement.

In the embodiment, the sweeping robot decides there is a charging requirement in various situations based on a preset processing logic. For example, in one situation, it decides there is a demand for charging when the electric quantity of the portable power source of the sweeping robot is lower than a preset electric quantity threshold. In another situation, it decides there is a demand for charging when the sweeping robot completes a cleaning task.

At step 1204, the sweeping robot determines if it is nearby the charging pile, if not, turn to step 1210, or turn to step 1206.

In the embodiment, the sweeping robot may retrieve a previously generated and stored map or generate the map of the working area it located in real time, so as to obtain the distance between itself and the charging pile marked in the map. The robot may decide that it is nearby the charging pile if the distance is smaller or equal to a preset distance, or the robot decides that it is far away from the charging pile.

At step 1206, the robot moves to the nearby area of the charging pile.

In the embodiment, based on the historical generated or real-time generated map, the sweeping robot may move to the nearby position of the charging pile marked on the map, wherein, the "nearby" may be understood as having a less distance from the charging pile marked on the map than a preset distance.

It should be noted that the sweeping robot may obtain the map of the area it located in many ways. In one embodiment, the sweeping robot is configured with a LDS device and related functional components. The LDS device may recognize the objects around the sweeping robot by obtaining the distances from the nearby objects, and generate the corresponding map in combination with the distance from each object. In another embodiment, the sweeping robot is configured with an image acquisition and process components, such as camera and processor. The sweeping robot performs image acquisition around it by the camera, and performs object recognition and processing to the acquired images by the processor, so as to learn the objects around it and the corresponding distances to generate the corresponding map. The sweeping robot can also generate the map in other ways, which is not limited herein.

At step 1208, the sweeping robot recognizes the charging pile.

In the embodiment, due to the limitations of the size, and processing capacity of the sweeping robot and other limitations, the accurate recognition distance for the charging pile has a certain limit, for example, the sweeping robot can complete scanning and recognition for the details of the charging pile when the distance between the sweeping robot and the charging pile is in the range of 60-80 cm, but the scanning and recognition ability for details will reduce if the distance is longer. Therefore, by moving to the area nearby the charging pile in advance based on the map, the sweeping robot can actively move to the area in which the details of the charging pile can be scanned and recognized without improving the ability for recognizing the charging pile, so as to enable the sweeping robot to exactly recognize the charging pile.

If the location of the charging pile is changed and the actual location is different from the marked location in the map, the sweeping robot cannot find the charging pile in the distance range of 60-80 cm from the original location of the charging pile, the sweeping robot may search for the charging pile around the original location, for example, take the original location as a center and draw a circle with a certain radius, and then move along the circle path and search for the charging pile.

In the embodiment, the charging pile is configured with the identification structure 2 in the embodiments shown in FIG. 4-10, and is recognized using the recognition method shown in FIG. 11, which will not be repeated herein.

At step 1210, the sweeping robot moves to the power interface.

In the embodiment, the sweeping robot may move to the power interface in the following way and finish the connection with the power interface.

When the sweeping robot and the charging pile is close enough, the sweeping robot may turn its body for 180-degree, and then swing in a small angle while slowing moving backward until the voltage of the charging electrode on the sweeping robot has a voltage increases to a predetermined vale and be stable in the process of berth, which indicates that it already berthed at the charging pile and achieved the connection with the power interface.

In the process of charging, it indicates the sweeping robot separates from the charging pile due to external factors if the voltage suddenly drops to 0, then the sweeping robot should move forward a certain distance and turn its body for 180-degree to re-perform the action of searching the charging pile. In the charging pile, if the voltage reduces to 0 in a certain rate, it indicates a power failure or the power line being disconnected. Because the inductor and the capacitor of adapter have stored a certain amount of energy and they will release the energy during power failure, the voltage between the two ends of the charging electrode doesn't suddenly drop to 0 but with a certain rate. In this case, the sweeping robot is just required to stay in the same position.

Corresponding to the method for recognizing a charging pile described above, the present disclosure also provides a device for recognizing a charging pile in an embodiment.

Figure 13:
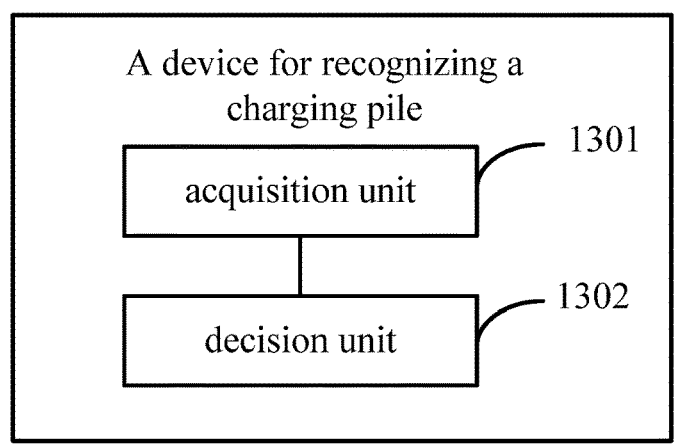
FIG. 13-18 is a block diagram illustrating a device for recognizing a charging pile according to an exemplary embodiment.

FIG. 13 is a block diagram illustrating a device for recognizing a charging pile according to an exemplary embodiment. As shown in FIG. 13, the device includes an acquisition unit 1301 and a decision unit 1302.

The acquisition unit 1301 is configured to acquire surface characteristics of surrounding objects; and The decision unit 1302 is configured to determine an object as the charging pile for an autonomous cleaning device when a surface of the object comprises surface characteristics matching with a preset identification structure within an allowed error range, wherein the preset identification structure includes a plurality of identification elements, and each of the plurality of identification elements includes at least one convex and at least one concave. A retroreflection coefficient of any one of the at least one convex and the at least one concave is smaller than that of the other one of the at least one convex and the at least one concave and sufficient to form a retroreflected light recognizable by the autonomous cleaning device, and at least one of the plurality of identification elements comprises a convex and a concave having mismatched specifications.

Figure 14:
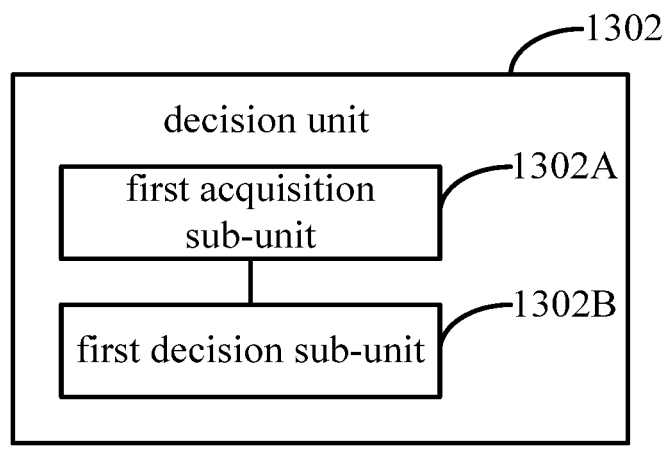

FIG. 14 is a block diagram illustrating another device for recognizing a charging pile according to an exemplary embodiment. As shown in FIG. 14, this embodiment is based on the embodiment shown in FIG. 13. The decision unit 1302 includes a first acquisition sub-unit 1302A and a first decision sub-unit 1302B.

The first acquisition sub-unit 1302A is configured to acquire preset specification parameters of the convex and the concave on the surface of the object, respectively.

The first decision sub-unit 1302B is configured to determine the object matches with the preset identification structure and determine the object as the charging pile for the autonomous cleaning device when the preset specification parameters of the convex and the concave on the surface of the object respectively match with preset specification parameters of a corresponding part of the preset identification structure.

Figure 15:
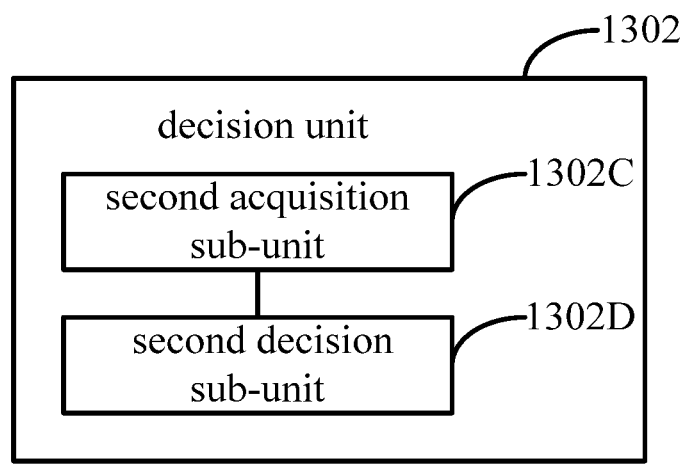

FIG. 15 is a block diagram illustrating another device for recognizing a charging pile according to an exemplary embodiment. As shown in FIG. 15, this embodiment is based on the embodiment shown in FIG. 13. The decision unit 1302 includes a second acquisition sub-unit 1302C and a second decision sub-unit 1302D.

The second acquisition sub-unit 1302C is configured to acquire retroreflection coefficients of the convex and the concave on the surface of the object, respectively.

The second decision sub-unit 1302D is configured to determine the object matches with the preset identification structure and determine the object as the charging pile for the autonomous cleaning device when the retroreflection coefficients of the convex and the concave on the surface of the object respectively match with preset specification parameters of a corresponding part of the preset identification structure.

Figure 16:
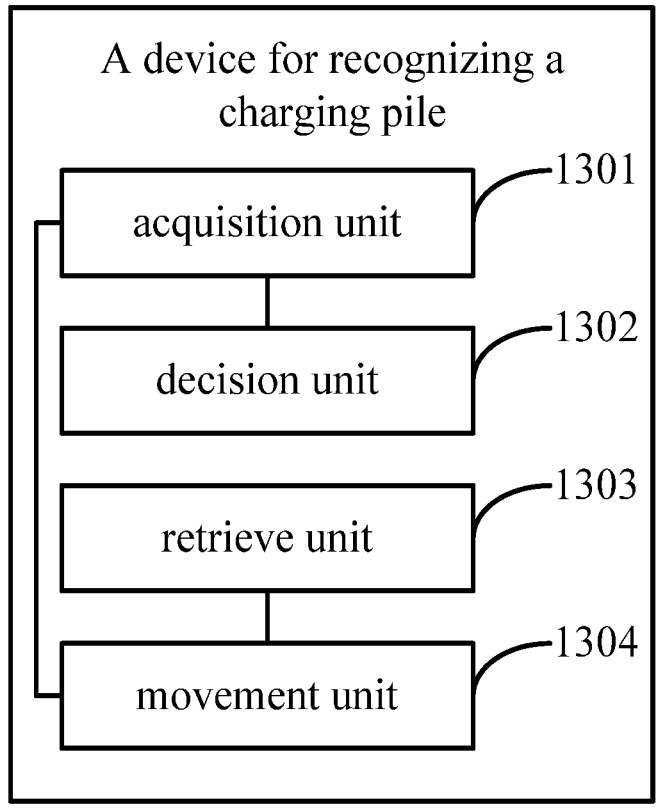

FIG. 16 is a block diagram illustrating another device for recognizing a charging pile according to an exemplary embodiment. As shown in FIG. 16, this embodiment is based on the embodiment shown in FIG. 13. The device may further include a retrieve unit 1303 and a movement unit 1304.

The retrieve unit 1303 is configured to retrieve a recorded map data when it is determined to return to the charging pile.

The movement unit 1304 is configured to moving, based on the map data, to an area in a preset distance range from a set position of the charging pile marked in the map data to recognize the charging pile by acquiring the surface characteristics of the surrounding objects.

Figure 17:
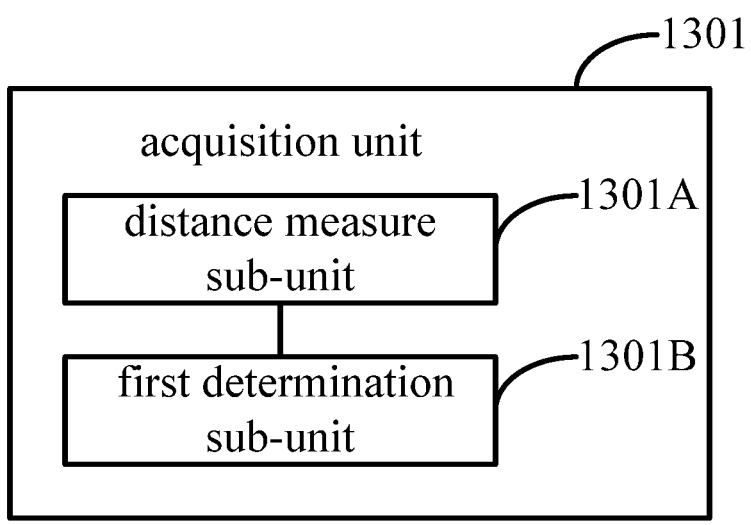

FIG. 17 is a block diagram illustrating another device for recognizing a charging pile according to an exemplary embodiment. As shown in FIG. 17, this embodiment is based on the embodiment shown in FIG. 13. The acquisition unit 1301 may include: a distance measure sub-unit 1301A and a first determination sub-unit 1301B.

The distance measure sub-unit 1301A is configured to measure, by a laser ranging device, distance from surrounding sampling points.

The first determination sub-unit 1301B is configured to determine the surface characteristics of the surrounding objects based on the distance.

It should be noted that the structures of the measure sub-module 1301A and the determination sub-module 1301B in the device embodiment shown in FIG. 17 may also be included in the device embodiments shown in FIG. 14-16, which is not limited herein.

Figure 18:
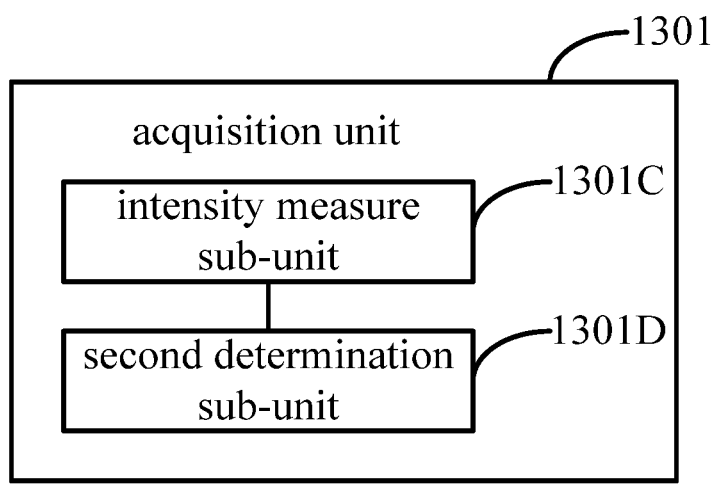

FIG. 18 is a block diagram illustrating another device for recognizing a charging pile according to an exemplary embodiment. As shown in FIG. 18, this embodiment is based on the embodiment shown in FIG. 13. The acquisition unit 1301 may include: an intensity measure sub-unit 1301C and a second determination sub-unit 1301D.

The intensity measure sub-unit 1301C is configured to measure, by a laser ranging device (LDS), reflected light intensities of the surrounding sampling points.

The second determination sub-unit 1301D is configured to determine the surface characteristics of the surrounding objects based on acquired data of the reflected light intensities.

It should be noted that the structures of the intensity measure sub-unit 1301C and a second determination sub-unit 1301D in the device embodiment shown in FIG. 18 may also be included in the device embodiments shown in FIG. 14-16, which is not limited herein.

The operations performed by each unit of the devices described in the above embodiments have already been described in details in the related method embodiments, which will not be repeated herein.

With respect to the device embodiments, they basically correspond to the method embodiments, so the related parts just refer to the description for the parts in the method embodiments. All the device embodiments described above are merely illustrative. The units described as a separate element may be or may not be physically separated, and the components described as an unit may be or may not be a physical unit, that is, they may be located in one place or be distributed to multiple network element. Part or all of the modules may be selected as needed to achieve the purpose of the present disclosure. Those skilled in the art may understand and practice the present disclosure without any creative work.

Correspondingly, a device for recognizing a charging pile is also provided by the present disclosure, comprises: a processor; and a memory for storing instructions executable by the processor; wherein the processor is configured to: acquire surface characteristics of surrounding objects; determine an object as the charging pile when a surface of the object comprises surface characteristics matching with a preset identification structure within an allowed error range; wherein the preset identification structure comprises a plurality of identification elements, each of the plurality of identification elements comprising at least one convex and at least one concave; wherein a retroreflection coefficient of any one of the at least one convex and the at least one concave is smaller than that of the other one of the at least one convex and the at least one concave and sufficient to form a retroreflected light recognizable by the autonomous cleaning device; and wherein at least one of the plurality of identification elements comprises a convex and a concave having mismatched specifications.

Correspondingly, an autonomous cleaning device is also provided by the present disclosure and comprises a memory and one or more programs which are stored in the memory. One or more processors are configured to implement the one or more programs including codes for performing the following operations: acquiring surface characteristics of surrounding objects; determining an object as the charging pile when a surface of the object comprises surface characteristics matching with a preset identification structure within an allowed error range; wherein the preset identification structure comprises a plurality of identification elements, each of the plurality of identification elements comprising at least one convex and at least one concave; wherein a retroreflection coefficient of any one of the at least one convex and the at least one concave is smaller than that of the other one of the at least one convex and the at least one concave and sufficient to form a retroreflected light recognizable by the autonomous cleaning device; and wherein at least one of the plurality of identification elements comprises a convex and a concave having mismatched specifications.

Other embodiments will be apparent to those skilled in the art from consideration of the specification and practice of the disclosures herein. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the invention being indicated by the following claims.

It will be appreciated that the disclosure is not limited to the exact construction that has been described above and illustrated in the accompanying drawings, and that various modifications and changes can be made without departing from the scope thereof. It is intended that the scope of the invention only be limited by the appended claims.

What is claimed is:

1. A charging pile for an autonomous cleaning device, the charging pile comprising:
a pile body having a side surface;
a power interface provided on the side surface of the pile body to supply power for the autonomous cleaning device;
an identification structure arranged on the side surface of the pile body to enable the autonomous cleaning device to recognize a position of the power interface and comprising a plurality of identification elements, each of the plurality of identification elements comprising at least one convex and at least one concave;
wherein for each identification element, a retroreflection coefficient of the at least one convex is smaller than that of the at least one concave and sufficient to form a retroreflected light recognizable by the autonomous cleaning device; and
wherein at least one of the plurality of identification elements comprises a convex and a concave having mismatched specifications.

2. The charging pile of claim 1, wherein a gray value of any one of the at least one convex and the at least one concave is greater than that of the other one of the at least one convex and the at least one concave such that the retroreflection coefficient of any one of the at least one convex and the at least one concave is smaller than that of the other one of the at least one convex and the at least one concave.

3. The charging pile of claim 1, wherein difference between preset specification parameters of an identification element with matched specifications is not greater than a recognition error of the recognition device, and
difference between preset specification parameters of an identification element with mismatched specifications is greater than the recognition error of the recognition device.

4. The charging pile of claim 1, wherein the preset specification parameter of each convex or each concave is not smaller than a minimum recognizable distance of the recognition device.

5. The charging pile of claim 1, wherein depth between the surface of the convex and the surface of the concave in each identification element is not smaller than the recognition error of the recognition device.

6. The charging pile of claim 1, wherein specification of a bottom surface of the concave cooperates with specification of a side wall of the concave, such that during recognition of any side surface of the charging pile by the recognition device in a preset angle range, the side wall of the concave shields at most a part of the bottom surface and at least one part of the bottom surface of the concave is recognizable, wherein preset specification parameters of the at least one part are not smaller than the recognition error of the recognition device and the minimum recognizable distance of the recognition device.

7. The charging pile of claim 1, wherein multiple identification elements and the convex and the concave of each identification element are arranged in a direction along a preset recognition path of the recognition device to enable the recognition device to sequentially determine preset specification parameters of respective identification elements.

8. A method for recognizing a charging pile, applied in an autonomous cleaning device, the method comprising:
acquiring surface characteristics of surrounding objects;
determining an object as the charging pile when a surface of the object comprises surface characteristics matching with a preset identification structure within an allowed error range;
wherein the preset identification structure comprises a plurality of identification elements, each of the plurality of identification elements comprising at least one convex and at least one concave;
wherein for each identification element, a retroreflection coefficient of the at least one convex is smaller than that of the at least one concave and sufficient to form a retroreflected light recognizable by the autonomous cleaning device; and
wherein at least one of the plurality of identification elements comprises a convex and a concave having mismatched specifications.

9. The method of claim 8, wherein determining the object as the charging pile when the surface of the object comprises the surface characteristics matching with the preset identification structure within the allowed error range comprises:
acquiring preset specification parameters of the convex and the concave on the surface of the object, respectively; and
determining the object as the charging pile when the preset specification parameters of the convex and the concave on the surface of the object respectively match with preset specification parameters of a corresponding part of the preset identification structure.

10. The method of claim 8, wherein determining the object as the charging pile when the surface of the object comprises the surface characteristics matching with the preset identification structure within the allowed error range comprises:
acquiring retroreflection coefficients of the convex and the concave on the surface of the object, respectively; and
determining the object as the charging pile when the retroreflection coefficients of the convex and the concave on the surface of the object respectively match with retroreflection coefficients of a corresponding part of the preset identification structure.

11. The method of claim 8, further comprising:
retrieving a recorded map data when it is determined to return to the charging pile; and
moving, based on the map data, to an area in a preset distance range from a set position of the charging pile marked in the map data to recognize the charging pile by acquiring the surface characteristics of the surrounding objects.

12. The method of claim 8, wherein acquiring the surface characteristics of the surrounding objects comprises:
measuring, by a laser ranging device, distances from surrounding sampling points; and
determining the surface characteristics of the surrounding objects based on the distances.

13. The method of claim 8, wherein acquiring the surface characteristics of the surrounding objects comprises:
measuring, by a laser ranging device, reflected light intensities of the surrounding sampling points; and
determining the surface characteristics of the surrounding objects based on the reflected light intensities.

14. A device for recognizing a charging pile, the device comprising:
- a processor; and
- a memory for storing instructions executable by the processor;
- wherein the processor is configured to:
- acquire surface characteristics of surrounding objects;
- determine an object as the charging pile when a surface of the object comprises surface characteristics matching with a preset identification structure within an allowed error range;
- wherein the preset identification structure comprises a plurality of identification elements, each of the plurality of identification elements comprising at least one convex and at least one concave;
- wherein for each identification element, a retroreflection coefficient of the at least one convex is smaller than that of the at least one concave and sufficient to form a retroreflected light recognizable by the autonomous cleaning device; and
- wherein at least one of the plurality of identification elements comprises a convex and a concave having mismatched specifications.

* * * * *